United States Patent [19]
Wettre

[11] 3,719,203
[45] March 6, 1973

[54] SAFETY VALVE FOR OIL FILLED CABLE

[75] Inventor: Gunnar Wettre, 1370 Asker, Norway

[73] Assignee: International Standard Electric Corporation, New York, N.Y.

[22] Filed: Oct. 13, 1971

[21] Appl. No.: 188,881

[52] U.S. Cl. .................. 137/554, 137/559, 251/61.4
[51] Int. Cl. ............................................. F16k 37/00
[58] Field of Search .............. 137/554, 559; 251/61.4

[56] References Cited

UNITED STATES PATENTS 3,390,943 7/1968 Myers..............................137/554 X
3,606,242 9/1971 Lathrop...........................137/554 X

*Primary Examiner*—Henry T. Klinksiek
*Attorney*—C. Cornell Remsen, Jr. et al.

[57] ABSTRACT

Oil pressure in oil filled cables is sensed and controlled by a valve arrangement which prevents damage to the oil pressure tank. Expansion or contraction of a pressure cell with the outflow or inflow of oil moves a piston against upper or lower valve seats to stop oil flow. A magnet on one end of the piston actuates upper and lower reed relays to set off a detector or alarm device at predetermined limits.

5 Claims, 1 Drawing Figure

PATENTED MAR 6 1973 3,719,203
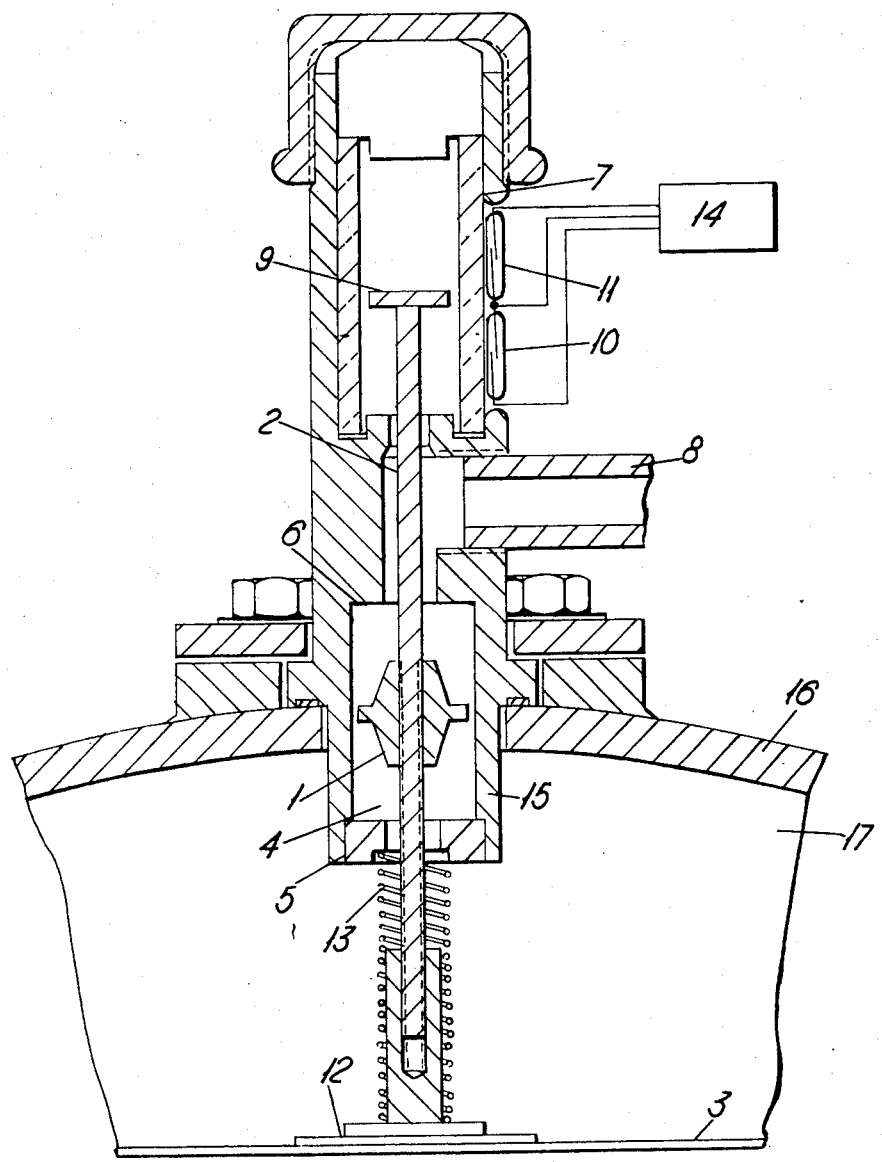
Inventor
GUNNAR WETTRE
By Edward Goldberg
Attorney

SAFETY VALVE FOR OIL FILLED CABLE

BACKGROUND OF THE INVENTION

1. Field of the Invention

This invention concerns a device for protecting a high pressure tank against overloading and particularly concerns a compensating high pressure tank used to feed oil into and out of an oil pressure cable.

2. Description of the Prior Art

A compensating high pressure tank used in connection with oil filled cables generally consists of an external rigid steel container which has a wall thickness designed to withstand the nominal oil pressure. Within this container there are situated a battery of hollow flexible cells which are built up of corrugated thin steel plates. These cells are connected with each other by a pipe which for example is made of copper. This pipe also passes through the wall of the outer steel container and has a valve through which the cells may be filled with gas of a desired pressure. Nitrogen gas is often used as the pressure medium. The space between the outer container and the internal pressure cells is filled with degassed cable oil. This design allows the gas pressure within the cells to be transferred to the cable oil in the container without direct physical contact between the gas and the liquid.

When cable oil passes from the high pressure tank to the cable the cells expand and when the oil flows in the opposite direction this causes the cells to contract. As long as the space between the outer container walls and the pressure cells is filled with oil, the oil will exert a reactive pressure against the cell walls balancing the internal gas pressure within the cells. The cells therefore are not exposed to any mechanical strain except for the small elastic strain caused by the cell walls themselves.

Such an oil pressure tank is widely used in all plants making oil filled cables. When, however, an uncontrolled oil leak occurs in the cables connected to such an oil pressure tank, the oil will flow out of the tank and the pressure cells will expand until they are bursting. Thereafter gas may enter into the cable and this may cause considerable damage both to the cable and to the oil system.

Various types of safety valves for oil cable systems are available, but these known valves will not protect against damage of the above mentioned kind. There are also special tanks equipped with free floating unfastened internal expansion cells having a buoyancy force which changes with the volume to coact with electrical maximum/minimum switches. This is, however, a rather expensive construction and is dependent upon a movable or floating flexible battery of cells. This requires a flexible pipe for the pressure medium and the movements will cause reduced lifetime for the system. Also the switches which will be operated infrequently are subjected to corrosion and faulty operation. In addition, it would be necessary to change the entire tank and cell system, in order to use this type of protection in existing plants. Finally there are known systems which include manometers and flowmeters. These enable a warning to be given when a fault occurs, but will not automatically stop the flow of oil in such cases unless expensive mechanical/electrical transducers are included in the system.

SUMMARY OF THE INVENTION

The object of this invention therefore is to provide a device for protection of oil pressure tanks of the above mentioned type against excessive expansion or compression of the pressure cells, and may also be adapted to conventional systems not already equipped with protection devices. The apparatus is also inexpensive and reliable.

The present invention concerns a device for protection of an oil pressure tank providing oil to an oil pressure cable against any kind of overpressure, which tank comprises an outer pressure resistant container and internal, flexible, hollow pressure cells. The invention is characterized by the fact that the oil which is fed to and from the oil cable has to pass through a valve which is controlled by the volume changes of the cells in the tank in such a manner that the closing of the valve depends upon the cell volume.

Another feature of the invention is that the valve is a double acting valve and is controlled in such a manner that it is closed both when the cell volume exceeds a first predetermined value and when it passes below a second predetermined value. A further feature is that the valve includes a control device which provides an indication or alarm when the valve is closed. Thus the message will be given that the cable no longer has a connection with the compensating pressure tank.

An apparatus for performing the above mentioned operation comprises a valve having a piston which mechanically cooperates with the wall of the outermost of the cells in such a manner that when the cells expand to the allowable limit, the valve stops the flow of oil to the cable. Preferably the piston is mounted in a valve cylinder. A space is provided between the piston and the cylindrical valve housing to let the flow of oil pass without hindrance and there is also a passage around the piston shaft to permit the oil to pass axially through the valve housing. An axially adjustable member is mounted on the piston shaft and is pressed against the cell wall. The valve housing for the piston extends through a hole in the container wall. The flow of oil is permitted to pass through a passageway around the piston shaft and the piston and through the valve housing. The passageway will thus be closed by the piston and coacting valve seats when the cells have reached their outermost permissible positions.

The apparatus may further be equipped with a double acting valve and piston such that when the piston has moved to a predetermined position either outwardly or inwardly, the valve, which has two opposite valve seats cooperating with the appropriate face of the piston, will stop the flow of oil. The apparatus may also be equipped with an indicating device which provides a signal when the valve is closed. This device may consist of a permanent magnet fixed to the piston shaft and two externally mounted reed relays operated by the magnet.

BRIEF DESCRIPTION OF THE DRAWINGS

The principle of the invention will be described below with reference to the accompanying drawing in which the FIGURE shows a front view of the novel valve in partial cross-section.

DESCRIPTION OF THE PREFERRED EMBODIMENT

The valve shown in the drawing consists of a double acting valve piston 1 secured to piston shaft 2 which mechanically co-operates with the outermost of the pressure cells 3. The valve piston is movably mounted within a valve chamber 4 which has valve seats 5 and 6 at opposite ends thereof. The valve chamber is produced in one piece and includes equipment for a cell volume indicator 7 and an output pipe 8 for the oil flux. This pipe 8 will preferably be equipped with a valve not shown in the FIGURE. When oil passes outwardly through the pipe 8, the movable cell 3 expands and after a predetermined movement of the cell wall the piston 1 is pressed against its appropriate valve seat 6. When the tank is drained to the maximum extent allowed by its construction, the valve thus closes and prevents further oil flow.

In the reverse direction, the flow of oil goes into the tank and the pressure cells contract. This will cause a downward movement of the piston until the piston shuts the valve as it is pressed against valve seat 5. This occurs with a full tank and prevents an overcontraction of the cells.

The safety valve shown is also equipped with a volume indicator and detector in which a permanent magnet 9 is arranged in such a way that when the piston 1 reaches one of its outermost positions, the magnet 9 will operate one of the reed relays 10 or 11 and thereby produce a signal indicating that the tank is completely filled or completely emptied. The signals from the reed relays then lead to the detector and/or alarm circuit 14. Preferably the cooperating surfaces of the moveable cell wall and the valve piston shaft, indicated at 12 in the FIGURE, are held in mechanical contact with each other by means of a spring 13.

If the tube 7 is made of glass it will also be possible to obtain a visual indication of the actual cell volume. In order to obtain good cooperation between the permanent magnet 9 and the reed relays 10 and 11, the relays are preferably placed in a recess in the valve housing near the glass tube 7.

As shown in the FIGURE, the valve housing 15 is mounted in an opening through a rigid wall 16 of the steel container, with a path for the oil from chamber 17 provided via valve chamber 4 around piston 1 and shaft 2 to output pipe 8.

The above description of a specific example is not to be considered as a limitation on the scope of this invention.

What is claimed is:

1. An oil pressure valve for oil filled cables comprising:
   a container having a rigid outer wall, an inner flexible pressure cell having a moveable wall, and an oil chamber between said moveable inner cell wall and rigid outer wall, said moveable inner wall moving inwardly and outwardly in accordance with the volume of oil in said chamber;
   a valve mounted in an opening through said outer wall to control the flow of oil;
   an output pipe connected to said valve on said outer wall; and
   actuating means connected between said cell wall and valve to close said valve upon a predetermined movement of said cell wall in accordance with said oil volume to stop the flow of oil between said oil chamber and output pipe.

2. The device of claim 1 wherein said valve includes a housing having a chamber with inner and outer openings at opposite ends, and said actuating means includes a movable shaft extending axially through said valve chamber and openings, a piston mounted on said shaft in said valve chamber, said valve chamber providing a passageway for oil around said piston and shaft, said output pipe being connected to said outer opening, and means for resiliently mounting said shaft against said movable inner cell wall, said shaft and piston being moved inwardly and outwardly within said valve chamber by said cell wall, said piston closing one of said inner and outer openings upon said predetermined movement of said cell wall.

3. The device of claim 2 wherein said piston is adapted to close said inner and outer openings respectively upon predetermined inward and outward movements of said cell wall.

4. The device of claim 3 including signal means for indicating the innermost and outermost positions of said shaft and piston.

5. The device of claim 4 wherein said signal means includes a magnet at the outermost end of said shaft and a pair of reed relays adjacent said end and spaced apart by the maximum movement of said shaft and piston.

* * * * *